March 20, 1956 P. H. TAYLOR 2,738,700
GLARE-STOPPED OPTICAL SYSTEM
Filed June 20, 1949
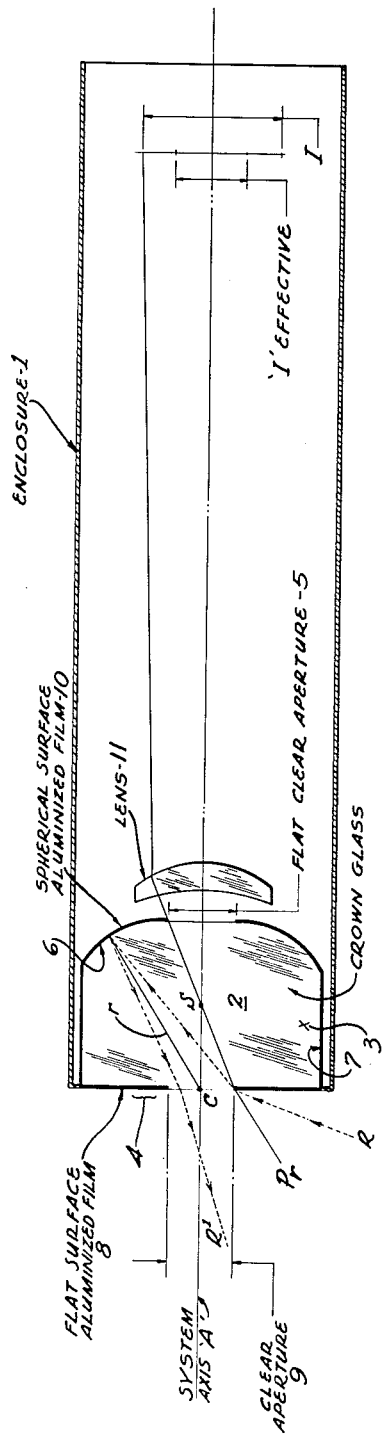
INVENTOR.
PHILIP H. TAYLOR
BY
*Herbert E. Metcalf*
ATTORNEY

United States Patent Office 2,738,700
Patented Mar. 20, 1956

2,738,700
GLARE-STOPPED OPTICAL SYSTEM

Philip H. Taylor, Los Angeles, Calif., assignor to Northrop Aircraft, Inc., Hawthorne, Calif., a corporation of California Application June 20, 1949, Serial No. 100,243

1 Claim. (Cl. 88—1)

The present invention relates to a means whereby an optical system can be substantially perfectly glare stopped.

In optical systems such as cameras, telescopes or the like, the usual means for providing the systems with glare-stops is the placing of apertured blackened discs in the system with the apertures thereof concentric with the optic axis of the system and so spaced along the axis that a minimum of the inner surface of the tube of the system is "seen" from any point in the field. Some of the light diffused from the edges of the stop apertures, however, always reaches the field, and provides glare, or noise, or reduced contrast in visual, electronic or photographic systems respectively.

It is an object of the present invention to provide a means for obtaining substantially perfect glare stopping in an optical system.

It is still another object of the present invention to provide a glare-stop for an optical system in which light diffusion from the edge of a glare-stop aperture is reduced to a minimum.

In brief, the present invention includes a glare-stop for an optical system in which a substantially opaque, apertured glare-stop is made in the form of an evaporated coating, preferably of metal on a block of optical glass or equivalent, so that the edge of the stopping aperture, being only on the order of a few molecules thick, diffuses a minimum of light into the field of the optical system. Preferably the stop is shaped to reflect stray light back through the entrance to the optical system.

The invention will be more fully explained, and thereby understood, by reference to the drawing which shows schematically one preferred form of the invention as applied to a simple corrected telescope system.

In the drawing, a telescope tube 1, supports at one end a combination field and aperture stop 2 comprising a solid plano-spherical block of crown glass 3. This block is formed with a front, flat surface 4 and a rear surface having a central, rear, clear aperture 5 and an outer, concentric, spherical surface 6. The sides 7 of the block 3 are cylindrical and fit just inside tube 1.

The front flat surface 4 is provided with a front film 8 formed by coating the block 3 with evaporated aluminum as is well known in the art, except for a central, circular, clear, front surface aperture 9. The rear surface of the block is provided with an aluminum coat 10 over an outer, annular, spherical portion 6, leaving the rear central aperture 5 of the rear surface clear. Preferably the clear portions 5 and 9 are exactly alined with the optical axis A of the system to form an exactly axial clear light transmitting cylinder with flat parallel faces, and the block is preferably ground and polished so that the center of curvature of the rear spherical surface 6 is exactly in the center C of the front clear aperture 9 as indicated by radius line r. The sides 7 are also preferably aluminized to join coats 8 and 10. When corrected images are called for, as in the system shown, a concave-convex lens 11 is placed back of clear rear aperture 5 so that an image I will be formed at the far end of telescope tube 1.

In the system just described, the effective aperture stop is at point S in block 3. Vignetting sets in immediately off-axis, and the illumination of the field reduces to zero at I, formed for example by light ray $P_r$.

Stray light, such as might arrive over ray R, shown in broken line, is returned through the clear front surface aperture 9 as indicated by broken line R'. Thus all the rays, except those forming the image are returned through the front aperture 9.

The only scattered light that can reach the image is that diffracted from the edges of the aluminum coatings 8 and 10 around front and rear apertures 9 and 5 respectively. As those coatings are only a few molecules thick, the light diffracted from the edges thereof is negligible and substantially perfect glare stopping is achieved.

It is to be noted that as it is only the edges of the coatings that diffract the stray light, the area coated by the evaporated metal can be confined, if desired, to the neighborhood of the edges of the apertures, the remainder of the block being otherwise covered. In this latter case, only the spherical surface 6 need be made reflective.

While I have described the system as being applied to a corrected telescope, if corrected images are not required the spherical surface 6 can be continued through the axis and used as the lens of the system.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is, therefore, claimed in any of its forms or modifications within the legitimate and valid scope of the appended claim.

What is claimed is:

In an optical system, an aperture stop reducing glare, comprising a solid block of optical glass having a front flat surface and a rear surface including an annular spherical surface portion having its center of curvature in the axis of said optical system at said front surface, and a rear central circular flat surface portion parallel to said front surface and centered on said axis, said front and rear surfaces being separated a substantial distance by a block portion having a cylindrical wall coaxial with the axis of said optical system, said block being coated with an opaque evaporated metal film except for said rear central circular flat surface, and a front central circular portion of said front flat surface corresponding in diameter and location to the position of said rear central flat surface portion whereby light rays entering the clear portion of said front surface at an angle and striking said annular spherical surface are reflected back through said front clear surface portion.

References Cited in the file of this patent

UNITED STATES PATENTS

| | | |
|---|---|---|
| 1,137,444 | Adams | Apr. 27, 1915 |
| 2,185,221 | Nakken | Jan. 2, 1940 |
| 2,377,932 | Gatewood | June 12, 1945 |
| 2,402,216 | Vennigerholz | June 18, 1946 |
| 2,485,873 | Flett | Oct. 25, 1949 |

FOREIGN PATENTS

| | | |
|---|---|---|
| 299,647 | Germany | Oct. 28, 1919 |
| 228,354 | Great Britain | Feb. 5, 1925 |